United States Patent
Kobayashi

(10) Patent No.: US 10,293,548 B2
(45) Date of Patent: May 21, 2019

(54) CROSS-SECTIONAL IMAGE GENERATING APPARATUS AND THREE-DIMENSIONAL PRINTING SYSTEM

(71) Applicant: Roland DG Corporation, Hamamatsu-shi, Shizuoka (JP)

(72) Inventor: Kouichi Kobayashi, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 120 days.

(21) Appl. No.: 15/710,856

(22) Filed: Sep. 21, 2017

(65) Prior Publication Data
US 2018/0104901 A1 Apr. 19, 2018

(30) Foreign Application Priority Data
Oct. 13, 2016 (JP) .................... 2016-201822

(51) Int. Cl.
| | | |
|---|---|---|
| B33Y 10/00 | (2015.01) | |
| B29C 64/393 | (2017.01) | |
| B29C 64/153 | (2017.01) | |
| B29C 64/106 | (2017.01) | |
| B33Y 50/02 | (2015.01) | |
| B29C 64/209 | (2017.01) | |
| G06K 15/10 | (2006.01) | |

(52) U.S. Cl.
CPC .......... *B29C 64/393* (2017.08); *B29C 64/106* (2017.08); *B29C 64/153* (2017.08); *B29C 64/209* (2017.08); *B33Y 10/00* (2014.12); *B33Y 50/02* (2014.12); *G06K 15/107* (2013.01)

(58) Field of Classification Search
CPC .............................. B29C 64/393; B33Y 10/00
See application file for complete search history.

(56) References Cited

U.S. PATENT DOCUMENTS

2016/0046076 A1* 2/2016 Huang ................. B29C 64/386
700/98

* cited by examiner

*Primary Examiner* — Mark A Connolly
(74) *Attorney, Agent, or Firm* — Keating & Bennett, LLP

(57) ABSTRACT

A cross-sectional image generating apparatus includes a mask placer to place a mask on a first cross-sectional image such that a target pixel of the first cross-sectional image corresponds in position to a center pixel of the mask, a calculator to calculate a final value of a random variable for each of the pixels of the first cross-sectional image to be regarded as the target pixel corresponding in position to the center pixel, a colored pixel setter to set a printed pixel to be a colored pixel in accordance with the final value of the random variable calculated, a non-colored pixel setter to set the printed pixel or non-printed pixel to be a non-colored pixel in accordance with the final value of the random variable calculated, and a cross-sectional image generator to add color information to the colored pixel, and generates a second cross-sectional image representing the colored and non-colored pixels.

6 Claims, 9 Drawing Sheets

CROSS-SECTIONAL IMAGE GENERATING APPARATUS AND THREE-DIMENSIONAL PRINTING SYSTEM

CROSS REFERENCE TO RELATED APPLICATIONS

This application claims the benefit of priority to Japanese Patent Application No. 2016-201822 filed on Oct. 13, 2016. The entire contents of this application are hereby incorporated herein by reference.

BACKGROUND OF THE INVENTION

1. Field of the Invention

The present invention relates to cross-sectional image generating apparatuses and three-dimensional printing systems.

2. Description of the Related Art

A three-dimensional printing apparatus to print a three-dimensional object by sequentially stacking layers each having a predetermined cross-sectional shape is known in the related art. In one example, a three-dimensional printing apparatus known in the related art includes: a tank storing powdery materials; and a printing head to discharge a binder onto the powdery materials stored in the tank. The three-dimensional printing apparatus sequentially stacks layers formed by curing the powdery materials with the binder. To print a three-dimensional object in full color, such a three-dimensional printing apparatus may further include an ink head to discharge ink onto the layers formed.

Printing a three-dimensional object in this case involves determining, in accordance with a cross-sectional image representing a predetermined cross-sectional shape, a region onto which the binder is to be discharged and a region onto which the ink is to be discharged. A cross-sectional image to be used for printing a three-dimensional object is generated using a computer program. An internal portion of a three-dimensional object may be visually unrecognizable from outside. In such a case, coloring an entirety of the internal portion in printing the three-dimensional object in full color leads to ink wastage and prolonged printing time. A conceivable solution to this problem is to set a colored pixel and a non-colored pixel in a cross-sectional image. The colored pixel is a pixel having any desired width and in the vicinity of the outline of a cross-sectional shape. The non-colored pixel is a pixel located inward of the colored pixel. Specifically, the non-colored pixel is a pixel located inside a figure defined by a line provided by reducing the outline of the cross-sectional shape. As used herein, the term "reducing" or "reduction" refers to reducing the size of a figure (which is a cross-sectional shape in this case) without degrading topological properties. The term "outline" refers to a boundary between white pixels and black pixels in a binarized cross-sectional image.

The following description discusses an example where the outline of a cross-sectional shape 101 illustrated in FIG. 13 is reduced. FIG. 13 illustrates a cross-sectional image 104 including: the cross-sectional shape 101; printed pixels 102 located inward of the cross-sectional shape 101; and non-printed pixels 103 located outward of the cross-sectional shape 101. FIG. 14 illustrates a mask 105 to reduce the cross-sectional shape 101 by two pixels. The mask 105 includes: a center pixel 107; and eight adjacent pixels 106 located around the center pixel 107. A process for reducing the outline of the cross-sectional shape 101 involves: placing the mask 105 such that the center pixel 107 of the mask 105 overlaps with each selected one of the pixels in FIG. 13; and regarding the pixel corresponding in position to the center pixel 107 as the non-printed pixel 103 when at least one of the adjacent pixels 106 of the mask 105 overlaps with the non-printed pixel 103. Repeatedly performing this process provides, as illustrated in FIG. 15, a cross-sectional image 109 including a reduced cross-sectional shape 108 defined by a line provided by reducing the outline of the cross-sectional shape 101. The printed pixels 102 in FIG. 15 include: pixels located outward of the outline of the reduced cross-sectional shape 108; and pixels located inward of the outline of the reduced cross-sectional shape 108. The printed pixels 102 located outward of the outline of the reduced cross-sectional shape 108 are set to be colored pixels 110. The printed pixels 102 located inward of the outline of the reduced cross-sectional shape 108 are set to be non-colored pixels 111.

Suppose that the outline of the cross-sectional shape 101 illustrated in FIG. 16 is reduced using the mask 105 illustrated in FIG. 14. In this case, one or some of the non-colored pixels 111 after reduction of the outline may be cut off from the other non-colored pixels 111 depending on the resolution (i.e., the number of pixels per unit area) of the image, and a plurality of groups of the non-colored pixels 111 may exist (see FIG. 17). Intermingling of the colored pixels 110 with one␣␣or more of the non-colored pixels 111 as illustrated in FIG. 17 may make it impossible to suitably print a layer and may degrade the quality of the resulting three-dimensional object. Thus, printing a high-quality three-dimensional object desirably requires a cross-sectional image in which colored pixels are not intermingled with unnecessary non-colored pixels.

SUMMARY OF THE INVENTION

Accordingly, preferred embodiments of the present invention provide cross-sectional image generating apparatuses and three-dimensional printing systems that are able to generate a cross-sectional image to be used for printing a high-quality three-dimensional object in full color.

A cross-sectional image generating apparatus according to a preferred embodiment of the present invention generates a cross-sectional image to be used by a three-dimensional printing apparatus so as to print a three-dimensional object to be printed. The three-dimensional printing apparatus prints the three-dimensional object by sequentially stacking layers each having a predetermined cross-sectional shape. The cross-sectional image generating apparatus includes a memory, a mask placer, a calculator, a determiner, a colored pixel setter, a non-colored pixel setter, and a cross-sectional image generator. The memory stores a first cross-sectional image that represents, on a pixel-by-pixel basis, the predetermined cross-sectional shape, a printed pixel located inward of the cross-sectional shape, and a non-printed pixel located outward of the cross-sectional shape. The mask placer places a mask on the first cross-sectional image. The mask includes a center pixel and a plurality of adjacent pixels surrounding the center pixel. The mask is placed on the first cross-sectional image such that, assuming that one of the pixels of the first cross-sectional image is a target pixel, the target pixel corresponds in position to the center pixel of the mask. The calculator calculates, for each of the pixels of the first cross-sectional image, a final value of a random variable using the Markov process and the Bayes estimation, which is done for each of the pixels to be regarded as the target pixel corresponding in position to the center pixel of the mask. The determiner determines whether the final value of the random variable calculated is equal to or greater than a predetermined threshold value. The colored pixel setter sets, when the final value of the random variable is equal to or greater than the predetermined threshold value and the pixel having the final value of the random variable is the printed pixel, the printed pixel to be a colored pixel. The non-colored pixel setter sets, when the final value of the random variable is smaller than the predetermined threshold value, the printed pixel to be a non-colored pixel, and when the final value of the random variable is equal to or greater than the predetermined threshold value and the pixel having the final value of the random variable is the non-printed pixel, sets the non-printed pixel to be a non-colored pixel. The cross-sectional image generator adds color information to the colored pixel, and generates a second cross-sectional image that represents the colored pixel to which the color information is added and the non-colored pixel.

When the final value of the random variable is equal to or greater than the predetermined threshold value and the pixel having the final value of the random variable is the printed pixel, the colored pixel setter of a cross-sectional image generating apparatus according to a preferred embodiment of the present invention sets the printed pixel to be the colored pixel. When the final value of the random variable is smaller than the predetermined threshold value, the non-colored pixel setter sets the printed pixel to be the non-colored pixel. When the final value of the random variable is equal to or greater than the predetermined threshold value and the pixel having the final value of the random variable is the non-printed pixel, the non-colored pixel setter sets the non-printed pixel to be the non-colored pixel. In the present preferred embodiment, the final value of the random variable is calculated using the Markov process and the Bayes estimation, so that the colored and non-colored pixels are set more accurately than when the mean value or median value is calculated as in a conventional method. Specifically, the use of the Markov process and the Bayes estimation removes noise, which affects the quality of the three-dimensional object, from a figure defined by a line provided by reducing the outline of the cross-sectional shape. Thus, the three-dimensional printing apparatus prepared separately from the cross-sectional image generating apparatus suitably prints and colors the layers. Consequently, the three-dimensional printing apparatus prints the three-dimensional object with high quality.

Various preferred embodiments of the present invention provide cross-sectional image generating apparatuses that generate a cross-sectional image to be used for printing a high-quality three-dimensional object in full color.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A three-dimensional printing system 5 including a three-dimensional printing apparatus 10 and a cross-sectional image generating apparatus 60 according to preferred embodiments of the present invention will be described below with reference to the drawings. The preferred embodiments described below are not intended to limit the present invention in any way. Components and elements having the same functions are identified by the same reference signs, and description thereof will be simplified or omitted when deemed redundant.

Figure 1:
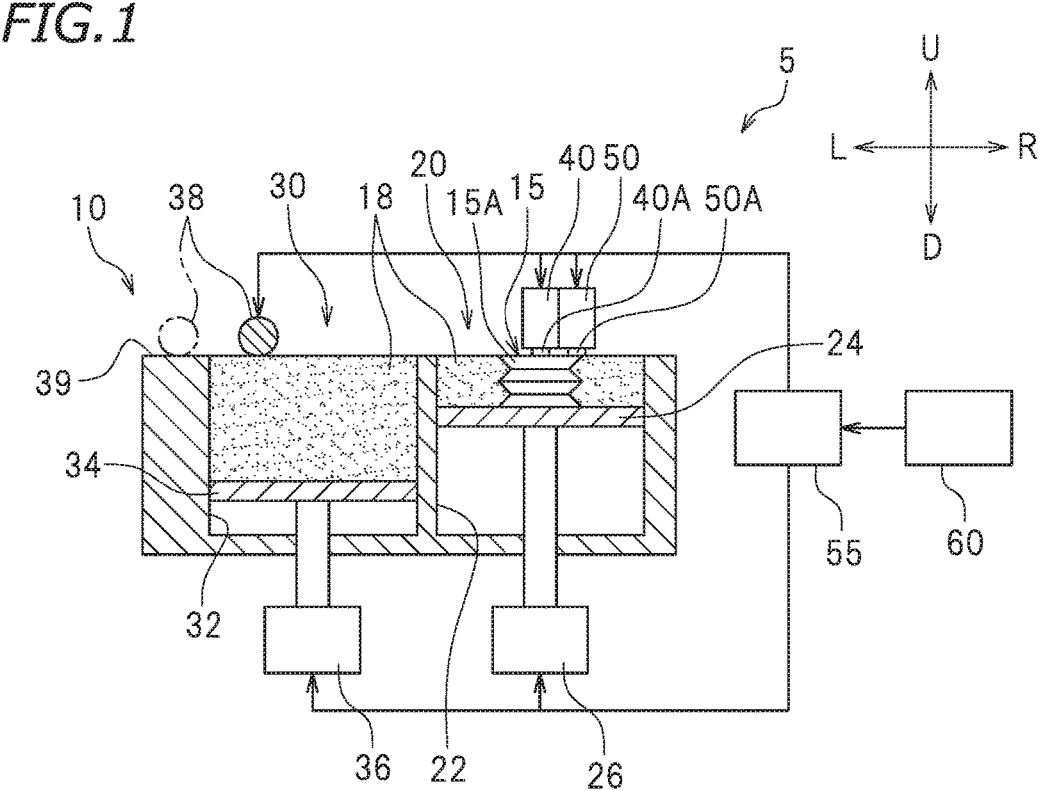
FIG. 1 is a schematic diagram illustrating a three-dimensional printing system according to a preferred embodiment of the present invention.
Figure 2:
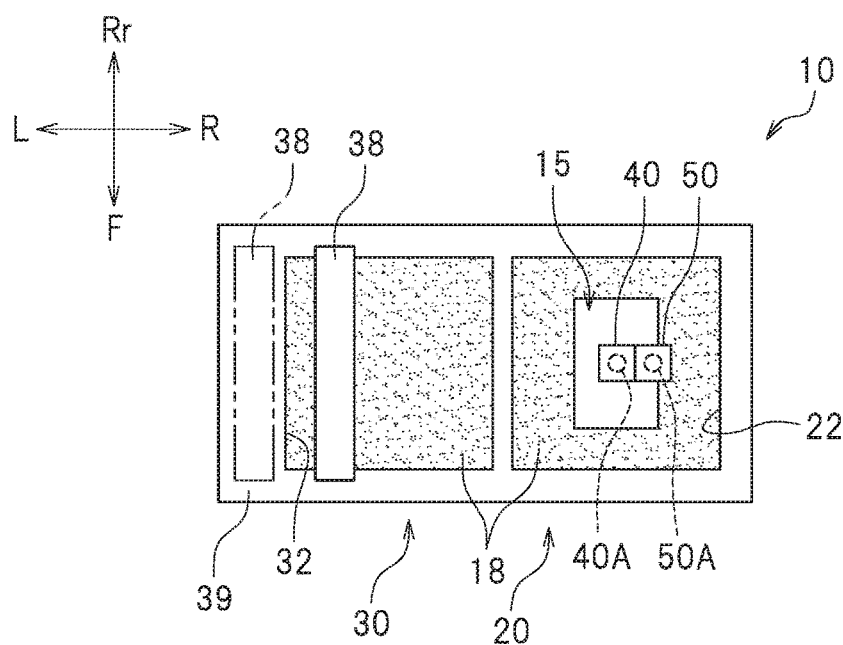
FIG. 2 is a plan view of a three-dimensional printing apparatus according to a preferred embodiment of the present invention.

FIG. 1 is a schematic diagram illustrating the three-dimensional printing system 5 according to the present preferred embodiment. FIG. 2 is a plan view of the three-dimensional printing apparatus 10. The reference signs "F", "Rr", "R", "L", "U", and "D" in the drawings respectively represent front, rear, right, left, up, and down. These directions are defined merely for the sake of convenience of description and do not limit how the three-dimensional printing apparatus 10 may be installed in any way.

The three-dimensional printing system 5 is a system to print a three-dimensional object in full color. As illustrated in FIG. 1, the three-dimensional printing system 5 includes the three-dimensional printing apparatus 10 and the cross-sectional image generating apparatus 60. In accordance with a full-color cross-sectional image representing a cross-sectional shape of a three-dimensional object, the three-dimensional printing apparatus 10 discharges a binder (which may be an adhesive) onto powdery materials so as to cure the powdery materials and sequentially stack powdery material layers each having a predetermined cross-sectional shape, thus printing the three-dimensional object in full color. The three-dimensional printing apparatus 10 does not necessarily have to discharge a binder onto powdery materials if the three-dimensional printing apparatus 10 is able to print a three-dimensional object in full color by discharging ink. As used herein, the term "cross-sectional shape" refers to the shape of a cross section obtained by slicing a three-dimensional object at predetermined intervals (e.g., at intervals of about 0.1 mm). A three-dimensional object does not necessarily have to be sliced at predetermined regular intervals. Examples of the "powdery materials" include gypsum, ceramic, metal, and plastic powder. The "binder" may be any binder that binds the powdery materials together.

As illustrated in FIG. 1, the three-dimensional printing apparatus 10 includes a printing unit 20, a feeder 30, a binder feed head 40, an ink head 50, and a controller 55. The binder feed head 40 is an example of a "printing head".

In the printing unit 20, a three-dimensional object 15 is printed. The printing unit 20 includes a printing tank 22, a printing table 24, and a table raising and lowering device 26. In the printing tank 22, powdery material layers 15A are formed on the printing table 24 so as to print the three-dimensional object 15. The printing tank 22 stores powdery materials 18 fed from the feeder 30. The printing table 24 is moved in an up-down direction within the printing tank 22. The printing table 24 is connected to the table raising and lowering device 26. The table raising and lowering device 26 moves the printing table 24 in the up-down direction. Once one powdery material layer 15A is formed on the printing table 24, the table raising and lowering device 26 moves the printing table 24 downward.

The feeder 30 feeds the powdery materials 18 to the printing unit 20. The feeder 30 includes a storage tank 32, a feed table 34, a table raising and lowering device 36, and a feed roller 38. The feed roller 38 is an example of a "feed member". The storage tank 32 stores the powdery materials 18. The feed table 34 is moved in the up-down direction within the storage tank 32. The feed table 34 is connected to the table raising and lowering device 36. The table raising and lowering device 36 moves the feed table 34 in the up-down direction. Once the powdery materials 18 are fed to the printing tank 22 from the storage tank 32, the table raising and lowering device 36 moves the feed table 34 upward. A distance by which the feed table 34 is moved upward in this case is equal to or substantially equal to, for example, a distance by which the printing table 24 is moved downward. The feed roller 38 feeds the powdery materials 18, stored in the storage tank 32, into the printing tank 22. The feed roller 38 is moved in a right-left direction above the storage tank 32 by a motor (not illustrated). As illustrated in FIGS. 1 and 2, when the feed roller 38 is at rest, the feed roller 38 is located at a roller home position 39 on the feeder 30. Rightward movement of the feed roller 38 from the roller home position 39 feeds the powdery materials 18, stored in the storage tank 32, into the printing tank 22. After return of the feed roller 38 to the roller home position 39, the table raising and lowering device 36 moves the feed table 34 upward.

The binder feed head 40 discharges the binder onto the powdery materials 18 fed to the printing tank 22, so as to form the powdery material layer 15A. Specifically, the binder feed head 40 discharges the binder onto the powdery materials 18 stored in the printing tank 22 and corresponding to a cross-sectional shape conforming to a full-color cross-sectional image, so as to form the powdery material layer 15A. In other words, the binder feed head 40 discharges the binder onto the powdery materials 18 in accordance with printed pixels 82 (see FIG. 4) of a first cross-sectional image (which will be described below). The binder feed head 40 includes a nozzle 40A to discharge the binder. The nozzle 40A is connected to a binder storage tank (not illustrated). The binder feed head 40 is connected to a driving device (not illustrated). Thus, the binder feed head 40 is movable in the right-left direction and front-rear direction above the printing tank 22.

The ink head 50 discharges ink onto the powdery material layer 15A formed by discharging the binder onto the powdery materials 18. Specifically, the ink head 50 discharges ink having colors based on the full-color cross-sectional image onto the powdery material layer 15A. In other words, the ink head 50 discharges ink onto the powdery material layer 15A in accordance with colored pixels 92 (see FIG. 5) of a second cross-sectional image (which will be described below). The ink head 50 includes a plurality of nozzles 50A to discharge the ink. The nozzles 50A are each connected to an associated one of a plurality of ink storage tanks (not illustrated). The ink head 50 is connected to a driving device (not illustrated). Thus, the ink head 50 is movable in the right-left direction and front-rear direction above the printing tank 22. In the present preferred embodiment, the binder feed head 40 and the ink head 50 are integral with each other. Alternatively, the binder feed head 40 and the ink head 50 may be separate from each other.

The controller 55 is connected to the binder feed head 40, the ink head 50, the feed roller 38, the table raising and lowering device 26, the table raising and lowering device 36, and the cross-sectional image generating apparatus 60. The controller 55 drives the table raising and lowering device 26 so as to move the printing table 24 upward or downward. The controller 55 drives the table raising and lowering device 36 so as to move the feed table 34 upward or downward. The controller 55 controls discharge of the binder from the binder feed head 40 and movement of the binder feed head 40. The controller 55 controls discharge of the ink from the ink head 50 and movement of the ink head 50. The controller 55 controls movement of the feed roller 38. The controller 55 receives data on a second cross-sectional image 90 (see FIG. 5) from the cross-sectional image generating apparatus 60. The second cross-sectional image 90 will be described below. The controller 55 is not limited to any particular configuration. In one example, the controller 55 may be a computer including a central processing unit (CPU), a read-only memory (ROM) storing, for example, a program or programs to be executed by the CPU, and a random-access memory (RAM).

Figure 3:
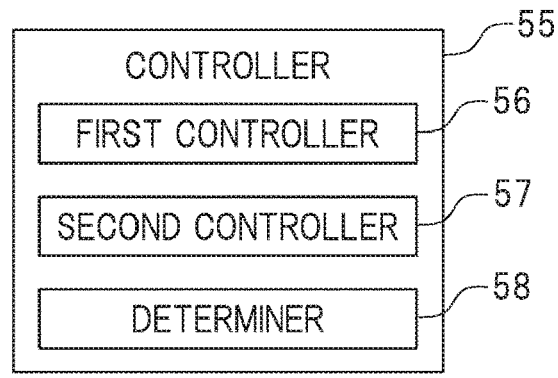
FIG. 3 is block diagram of a controller according to a preferred embodiment of the present invention.

As illustrated in FIG. 3, the controller 55 is configured or programmed to include a first controller 56, a second controller 57, and a determiner 58. The first controller 56 controls the binder feed head 40 in accordance with the printed pixels 82 of a first cross-sectional image 80 (see FIG. 4) so as to form the powdery material layer 15A. The first cross-sectional image 80 will be described below. Specifically, the first controller 56 controls the binder feed head 40 in accordance with the printed pixels 82 of the first cross-sectional image 80 so as to discharge the binder onto the powdery materials 18 stored in the printing tank 22, thus forming the powdery material layer 15A. The second controller 57 controls the ink head 50 in accordance with the colored pixels 92 of the second cross-sectional image 90 (see FIG. 5) so as to discharge the ink onto the powdery material layer 15A. The second cross-sectional image 90 will be described below.

Figure 4:
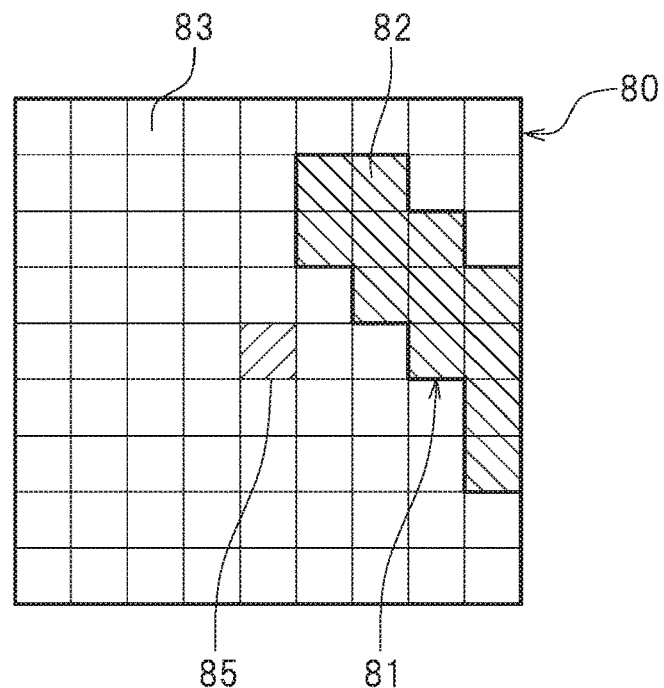
FIG. 4 is a schematic diagram illustrating a portion of a first cross-sectional image according to a preferred embodiment of the present invention.
Figure 5:
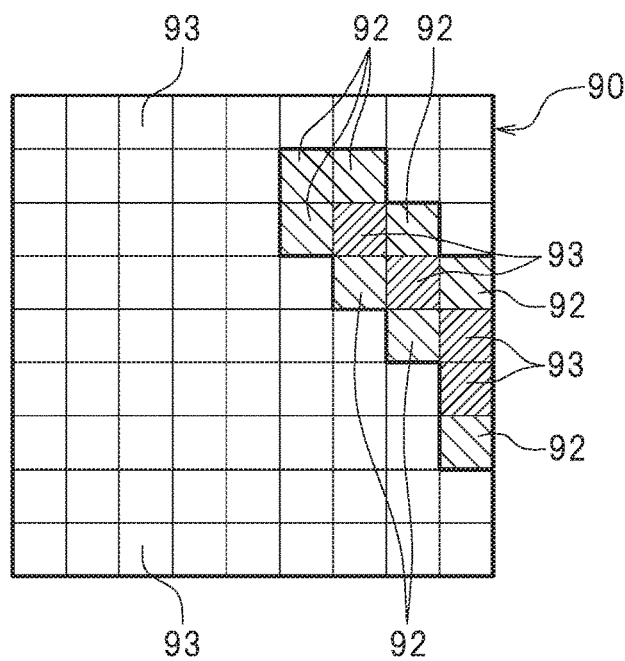
FIG. 5 is a schematic diagram illustrating a portion of a second cross-sectional image according to a preferred embodiment of the present invention.

The cross-sectional image generating apparatus 60 generates the second cross-sectional image 90 (see FIG. 5) in accordance with the first cross-sectional image 80 (see FIG. 4). As illustrated in FIG. 4, the first cross-sectional image 80 is a cross-sectional image that represents, on a pixel-by-pixel basis, a predetermined cross-sectional shape 81, the printed pixels 82 located inward of the cross-sectional shape 81, and non-printed pixels 83 located outward of the cross-sectional shape 81. The first cross-sectional image 80 is provided by horizontally slicing the three-dimensional object 15 at predetermined intervals. As illustrated in FIG. 5, the second cross-sectional image 90 is a cross-sectional image that represents the colored pixels 92 for which the ink is discharged from the ink head 50, and non-colored pixels 93 for which no ink is discharged from the ink head 50. The cross-sectional image generating apparatus 60 may be separate from the three-dimensional printing apparatus 10 or may be incorporated into the three-dimensional printing apparatus 10. When the cross-sectional image generating apparatus 60 is incorporated into the three-dimensional printing apparatus 10, the cross-sectional image generating apparatus 60 may be integral with the controller 55. In one example, the cross-sectional image generating apparatus 60 may be a computer including a central processing unit (CPU), a read-only memory (ROM) storing, for example, a program to be executed by the CPU, and a random-access memory (RAM). In the present preferred embodiment, the cross-sectional image generating apparatus 60 generates the full-color second cross-sectional image 90 using the program stored in the computer. The cross-sectional image generating apparatus 60 may be a computer exclusive to the three-dimensional printing system 5 or a general-purpose computer.

Figure 6:
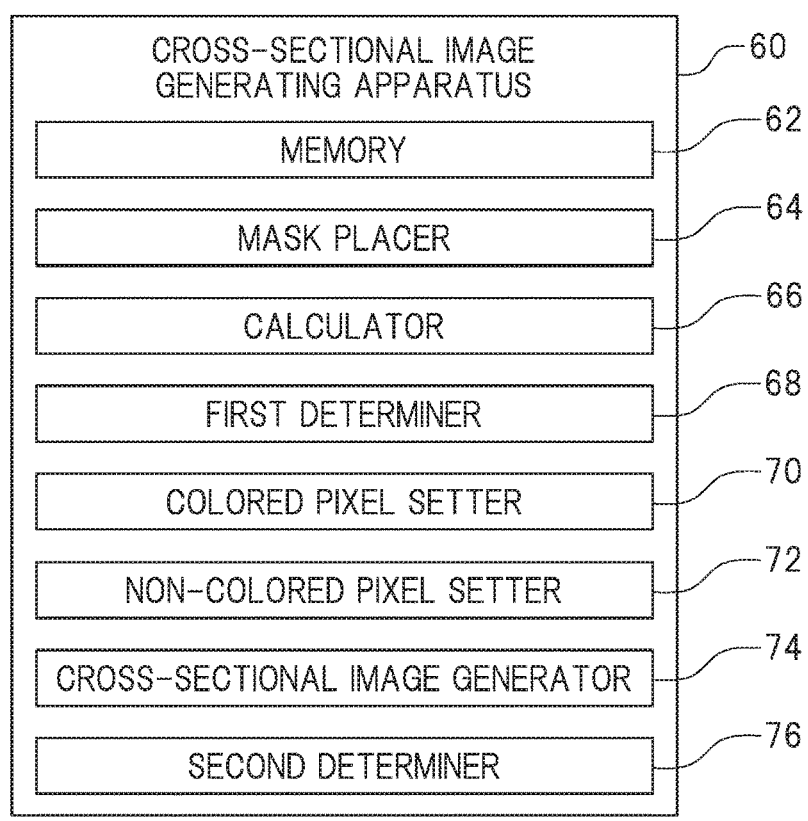
FIG. 6 is a block diagram of a cross-sectional image generating apparatus according to a preferred embodiment of the present invention.

As illustrated in FIG. 6, the cross-sectional image generating apparatus 60 includes a memory 62, a mask placer 64, a calculator 66, a first determiner 68, a colored pixel setter 70, a non-colored pixel setter 72, a cross-sectional image generator 74, and a second determiner 76.

The memory 62 stores a plurality of first cross-sectional images each representing the cross-sectional shape of an associated one of the powdery material layers 15A of the three-dimensional object 15 to be printed. The first cross-sectional image 80 illustrated in FIG. 4 is an example of the first cross-sectional image stored in the memory 62. The first cross-sectional image 80 includes the cross-sectional shape 81, the printed pixels 82, and the non-printed pixels 83. The cross-sectional shape 81 is represented on a pixel-by-pixel basis. The printed pixels 82 are located inward of the cross-sectional shape 81. The non-printed pixels 83 are located outward of the cross-sectional shape 81. In one example, the first cross-sectional image 80 is read into the memory 62 from a storage medium or another computer (not illustrated) in response to an operation by a user. The cross-sectional image generating apparatus 60 may generate the first cross-sectional image 80. The memory 62 further stores a plurality of second cross-sectional images generated by the cross-sectional image generating apparatus 60. The second cross-sectional image 90 illustrated in FIG. 5 is an example of the second cross-sectional image stored in the memory 62. The second cross-sectional image 90 includes the colored pixels 92 and the non-colored pixels 93. The colored pixels 92 are set by the colored pixel setter 70. The non-colored pixels 93 are set by the non-colored pixel setter 72.

Figure 7:
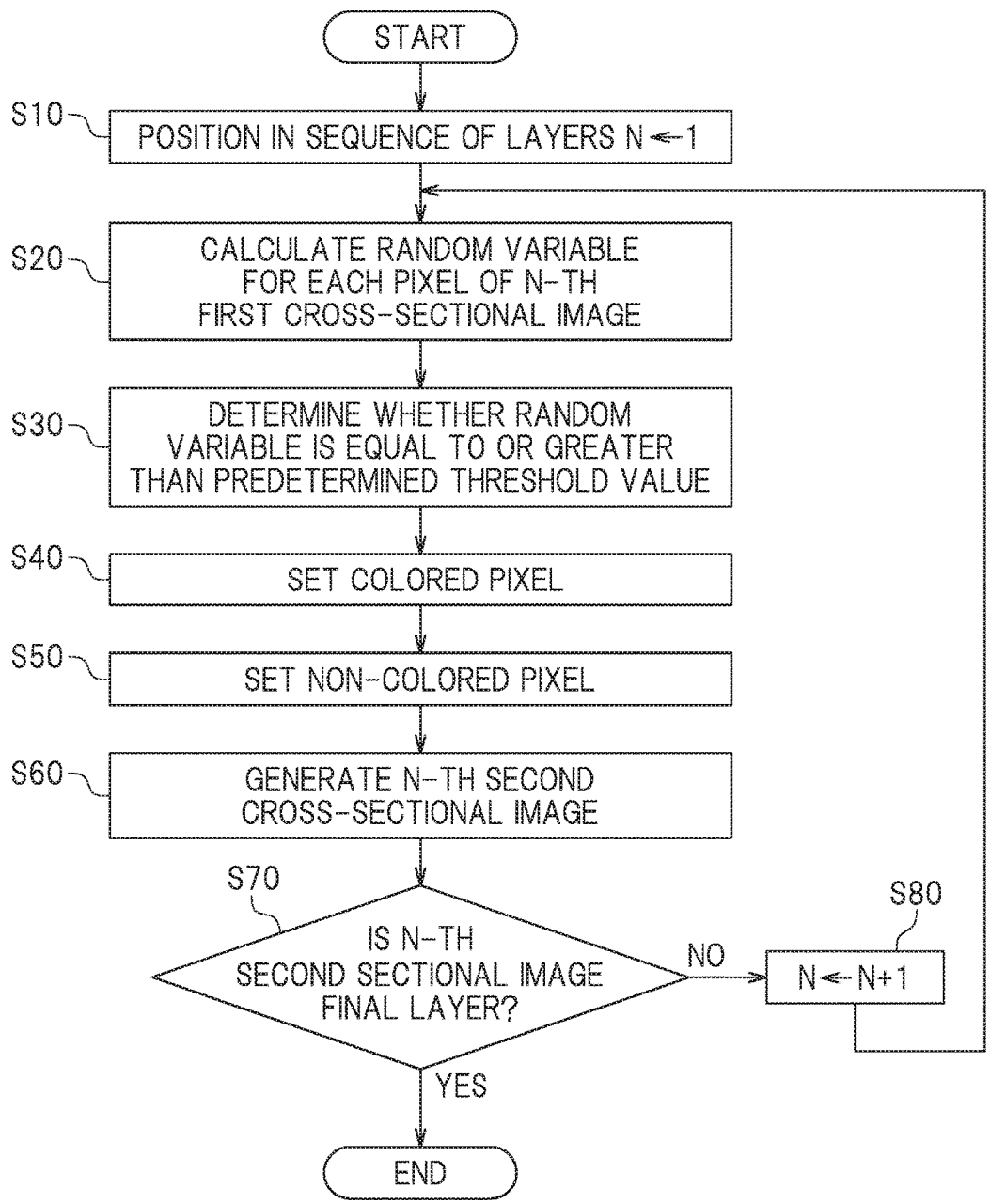
FIG. 7 is a flow chart illustrating a procedure for a second cross-sectional image generating process according to a preferred embodiment of the present invention.

FIG. 7 is a flow chart illustrating a procedure for generating the second cross-sectional image 90 (see FIG. 5) by the cross-sectional image generating apparatus 60. The procedure for generating the second cross-sectional image 90 will be described below.

First, in step S10, the cross-sectional image generating apparatus 60 sets the value of N indicative of the position of the powdery material layer 15A in a sequence of layers at "1" that represents the lowermost layer (i.e., the first layer). The cross-sectional image generating apparatus 60 then reads the N-th first cross-sectional image 80 from the memory 62.

Figure 8:
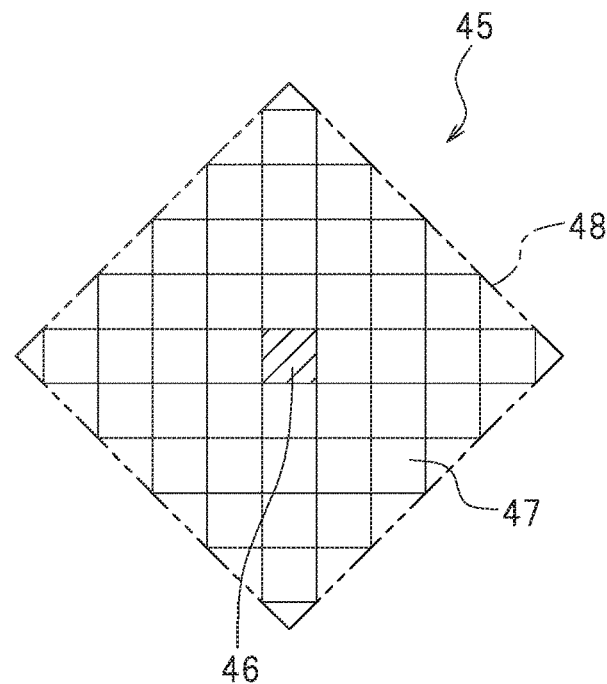
FIG. 8 is a schematic diagram illustrating a mask according to a preferred embodiment of the present invention.
Figure 15:
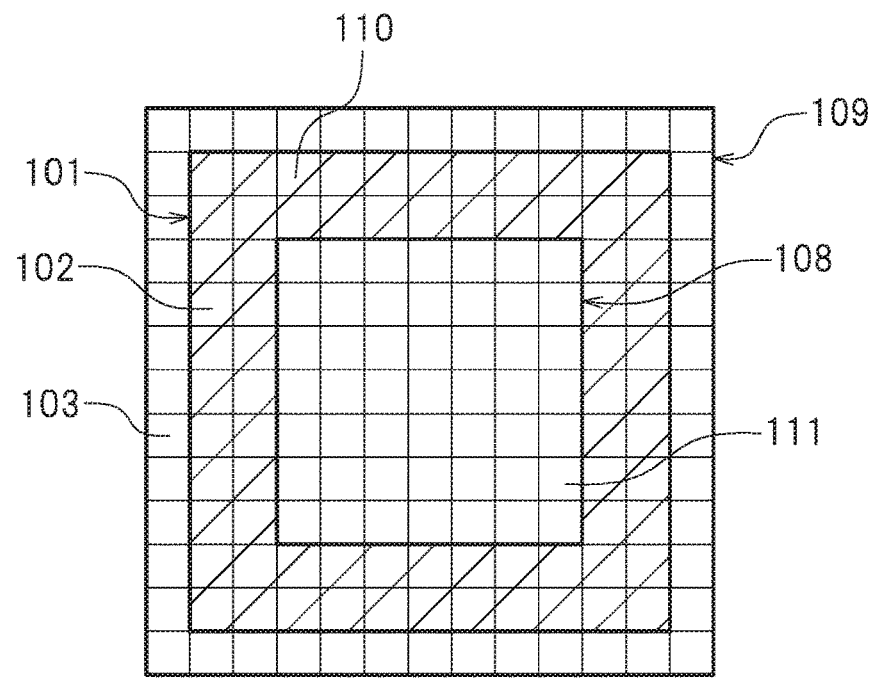
FIG. 15 is a schematic diagram illustrating a second cross-sectional image.
Figure 16:
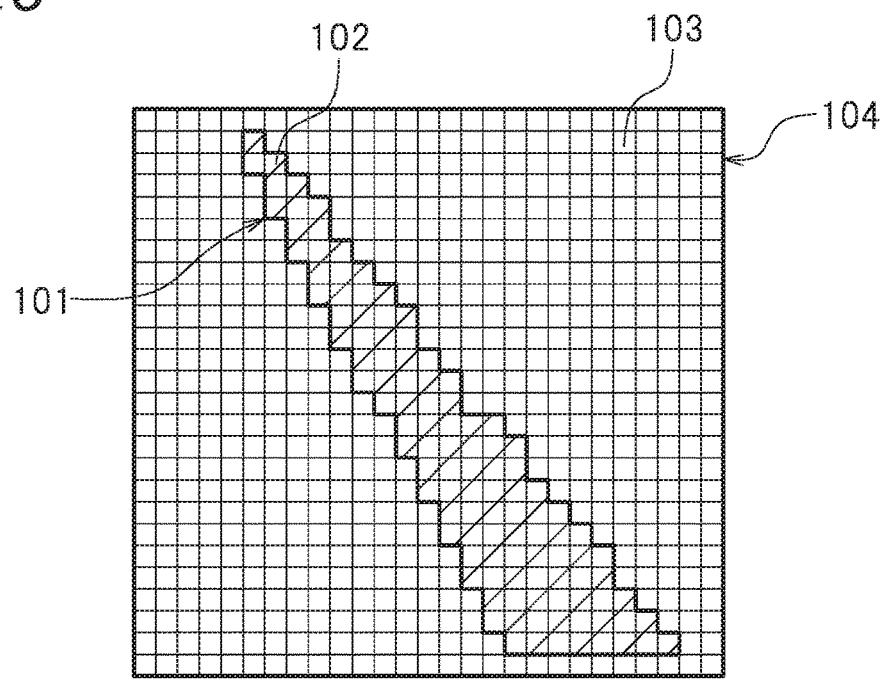
FIG. 16 is a schematic diagram illustrating a first cross-sectional image.
Figure 17:
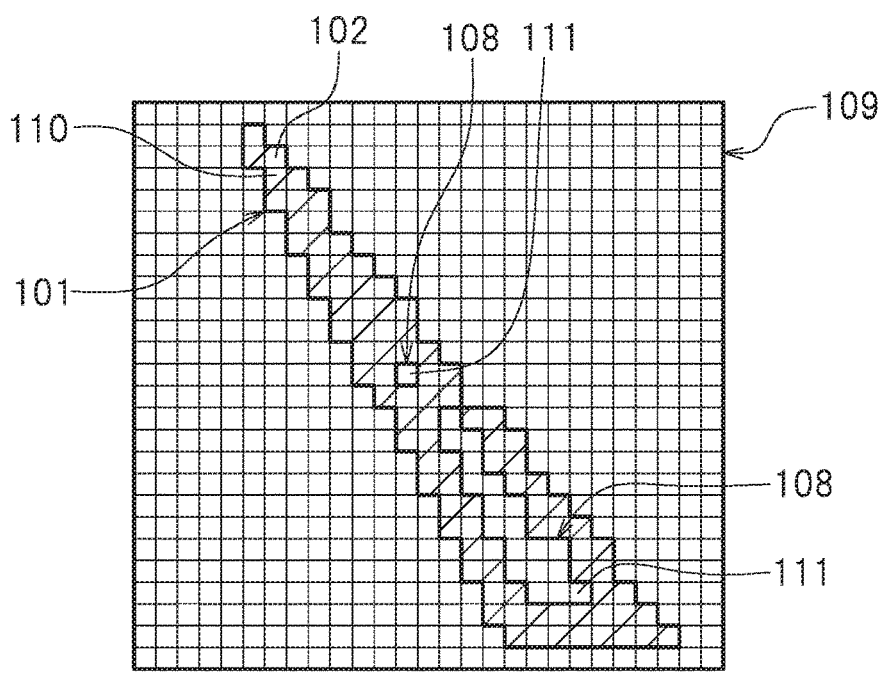
FIG. 17 is a schematic diagram illustrating a conventional second cross-sectional image.

In step S20, first, the mask placer 64 places a mask 45 (see FIG. 8) on the first cross-sectional image 80. As illustrated in FIG. 8, the mask 45 according to the present preferred embodiment includes: a center pixel 46 located at the center of the mask 45; and a plurality of adjacent pixels 47 uniformly surrounding the center pixel 46. In other words, the number of adjacent pixels 47 above the center pixel 46, the number of adjacent pixels 47 below the center pixel 46, the number of adjacent pixels 47 rightward of the center pixel 46, and the number of adjacent pixels 47 leftward of the center pixel 46 are equal to each other. The number of N adjacent pixels 47 included in the mask 45 is represented by Eq. (1) below. In the present preferred embodiment, N=40, so that the number of N adjacent pixels 47 included in the mask 45 is 40. The larger the number of adjacent pixels 47, the larger the reduction of an original image (i.e., the smaller the reduced cross-sectional shape 108 in the example illustrated in FIG. 15). In other words, the larger the number of adjacent pixels 47, the larger the number of colored pixels 92 (which will be described below). The smaller the number of adjacent pixels 47, the smaller the reduction of an original image (i.e., the larger the reduced cross-sectional shape 108 in the example illustrated in FIG. 15). In other words, the smaller the number of adjacent pixels 47, the smaller the number of colored pixels 92. The mask 45 preferably has a square shape or a substantially square shape, for example. This means that a quadrangle 48 circumscribing the mask 45 is square or substantially square.

$$N(x) = \left\{\left(\sum_{i=1}^{x} i\right) \times 4\right\} \quad (1)$$

The center pixel 46 of the mask 45 is influenced by the adjacent pixels 47 adjacent to the center pixel 46. Assuming that the degree of the influence is represented by Sum, Sum=40 in the example illustrated in FIG. 8. Using the mask 45, the values of random variables γ, β, and E (flg), which will be described below, are repeatedly calculated for each of the pixels of the first cross-sectional image 80 to be reduced (see Table 1), thus providing reduction results (see Table 3). The following description discusses in detail how the random variables are calculated.

Figure 9:
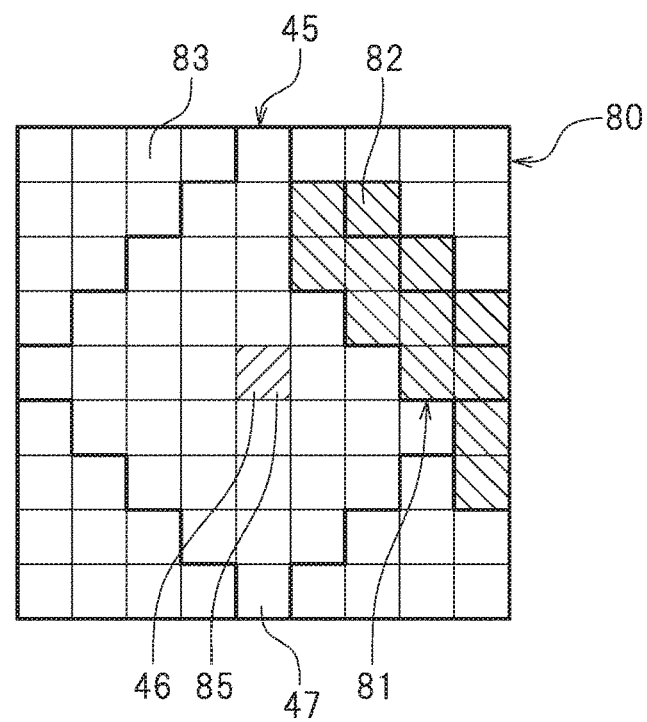
FIG. 9 is a schematic diagram illustrating the first cross-sectional image on which a mask according to a preferred embodiment of the present invention is placed.

As illustrated in FIG. 9, assuming that one of the pixels of the first cross-sectional image λ(i.e., one of the printed pixels 82 and the non-printed pixels 83) is set to be a target pixel 85, the mask placer 64 places the mask 45 on the first cross-sectional image 80 such that the target pixel 85 corresponds in position to the center pixel 46 of the mask 45. The mask placer 64 places the mask 45 in this manner for each of the pixels included in the first cross-sectional image 80 and set to be the target pixel 85. The order in which the pixels of the first cross-sectional image 80 are set to be the target pixel 85 is not limited to any particular order.

Subsequently, the calculator 66 calculates the values of the random variables γ, β, and E (flg) for the target pixel 85, corresponding in position to the center pixel 46 of the mask 45, by the Markov process and the Bayes estimation. The calculator 66 calculates the values of the random variables γ, β, and E (f|g) for each of the pixels of the first cross-sectional image 80 (i.e., for each of the printed pixels 82 and the non-printed pixels 83).

A random variable calculating method will be specifically described below. Referring to FIG. 4, assuming that the value of each non-printed pixel 83 is 1 and the value of each printed pixel 82 is −1, the first cross-sectional image 80 illustrated in FIG. 4 is represented by Table 1 below.

TABLE 1

| 1 | 1 | 1 | 1 | 1 | 1  | 1  | 1  | 1  |
|---|---|---|---|---|----|----|----|----|
| 1 | 1 | 1 | 1 | 1 | −1 | −1 | 1  | 1  |
| 1 | 1 | 1 | 1 | 1 | −1 | −1 | −1 | 1  |
| 1 | 1 | 1 | 1 | 1 | 1  | −1 | −1 | −1 |
| 1 | 1 | 1 | 1 | 1 | 1  | 1  | −1 | −1 |
| 1 | 1 | 1 | 1 | 1 | 1  | 1  | 1  | −1 |
| 1 | 1 | 1 | 1 | 1 | 1  | 1  | 1  | −1 |
| 1 | 1 | 1 | 1 | 1 | 1  | 1  | 1  | 1  |
| 1 | 1 | 1 | 1 | 1 | 1  | 1  | 1  | 1  |

Figure 10:
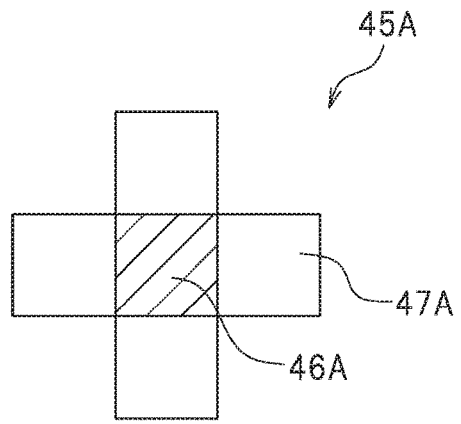
FIG. 10 is a schematic diagram illustrating another mask according to a preferred embodiment of the present invention.

As illustrated in FIG. 9, when the mask 45 is placed on the first cross-sectional image 80 such that the target pixel 85 corresponds in position to the center pixel 46 of the mask 45, the values of the adjacent pixels 47 of the mask 45 are represented by Table 2 below. Note that the value of the center pixel 46 is set at 0. As illustrated in FIG. 10, a center pixel 46A of a mask 45A is influenced by adjacent pixels 47A in the Markov process. In other words, the center pixel 46A is influenced by the adjacent pixels 47A neighboring the center pixel 46A. Assuming that the degree of the influence is represented by sum, sum is four in the example illustrated in FIG. 10.

TABLE 2

|   |   |   |   | 1 |   |    |    |    |
|---|---|---|---|---|---|----|----|----|
|   |   |   | 1 | 1 | −1|    |    |    |
|   |   | 1 | 1 | 1 | −1| −1 |    |    |
|   | 1 | 1 | 1 | 1 | 1 | −1 | −1 |    |
| 1 | 1 | 1 | 1 | 0 | 1 | 1  | −1 | −1 |
|   | 1 | 1 | 1 | 1 | 1 | 1  | 1  |    |
|   |   | 1 | 1 | 1 | 1 | 1  |    |    |
|   |   |   | 1 | 1 | 1 |    |    |    |
|   |   |   |   | 1 |   |    |    |    |

The calculator 66 then repeatedly calculates the value of the random variable E (f|g) for the target pixel 85 using Eq. (2) and Eq. (3) derived by the Markov process and the Bayes estimation. When the value of the random variable E (f|g) repeatedly calculated remains unchanged and is uniquely determined, i.e., when the value of the random variable E (f|g) obtained as a result of the repeated calculations is the same, the value obtained is determined to be the final value of the random variable E (f|g). In the example illustrated in Table 2, the final value of the random variable E (f|g) for the target pixel 85 is 0.76.

$$E(f \mid g) = \frac{1}{2}\beta \sum_{x=1}^{M}\sum_{y=1}^{N}(f_{x,y} - g_{x,y})^2 + \qquad (2)$$

$$\frac{1}{2}\alpha \sum_{x=1}^{M}\sum_{y=1}^{N}((f_{x,y} - g_{x+1,y})^2 + (f_{x,y} - g_{x,y+1})^2)$$

In Eq. (2), "M" is the number of horizontal pixels of an input image (which is the first cross-sectional image 80 in the present preferred embodiment), and "N" is the number of vertical pixels of the input image (i.e., the first cross-sectional image 80 in the present preferred embodiment). In Eq. (2), α is a threshold value. α may be any coefficient and is set such that an optimum result is obtained. In the present preferred embodiment, α is set at about 0.63, for example. In Eq. (2), x is a variable for the horizontal pixels, and y is a variable for the vertical pixels. In Eq. (2), $f_{x,y}$ is an object pixel. In Eq. (2), $g_{x,y}$ is an object pixel after reduction. In Eq. (2), $g_{x+1,y}$ is a pixel that is horizontally moved from the post-reduction object pixel by one pixel. In Eq. (2), $g_{x,y+1}$ is a pixel that is vertically moved from the post-reduction object pixel by one pixel. Eq. (2) is an equation well known in image processing that uses a probability model provided by the Markov process and the Bayes estimation. β is a value calculated for each pixel and is represented by Eq. (3) below.

$$\beta = \gamma \times \ln\left(\frac{1-p}{p}\right) \qquad (3)$$

In Eq. (3), γ is a random variable calculation result obtained using the mask 45 for each of the pixels of the first cross-sectional image 80 as illustrated in FIG. 9. In Eq. (3), p may be any coefficient that is a success probability of a binomial distribution. In the present preferred embodiment, p is about 0.2, for example. ln{(1−p/p)} is a mathematical expression that uses the value of the success probability p of the binomial distribution. The value of β given by Eq. (3) is a random variable obtained by reflecting the probability of the binomial distribution in the value of the random variable γ. In the example illustrated in Table 2, the value of the random variable β for the target pixel 85 is 1.38629.

The calculator 66 calculates the final value of the random variable E (f|g) for each target pixel 85 of the first cross-sectional image 80 using Eq. (2) and Eq. (3). The final values of the random variables E (f|g) for the pixels of the first cross-sectional image 80 illustrated in FIG. 4 are given in Table 3 below.

TABLE 3

| 0.76 | 0.76 | 0.76 | 0.76 | 0.76 | 0.59 | 0.59  | 0.76  | 0.76  |
|------|------|------|------|------|------|-------|-------|-------|
| 0.76 | 0.76 | 0.76 | 0.76 | 0.59 | 0.34 | 0.34  | 0.34  | 0.76  |
| 0.76 | 0.76 | 0.76 | 0.76 | 0.59 | 0.34 | −0.28 | 0.34  | 0.34  |
| 0.76 | 0.76 | 0.76 | 0.76 | 0.76 | 0.34 | 0.34  | −0.28 | 0.34  |
| 0.76 | 0.76 | 0.76 | 0.76 | 0.76 | 0.76 | 0.34  | 0.34  | −0.28 |
| 0.76 | 0.76 | 0.76 | 0.76 | 0.76 | 0.76 | 0.59  | 0.34  | −0.28 |
| 0.76 | 0.76 | 0.76 | 0.76 | 0.76 | 0.76 | 0.76  | 0.34  | 0.34  |
| 0.76 | 0.76 | 0.76 | 0.76 | 0.76 | 0.76 | 0.76  | 0.76  | 0.34  |
| 0.76 | 0.76 | 0.76 | 0.76 | 0.76 | 0.76 | 0.76  | 0.76  | 0.76  |

In step S30, the first determiner 68 determines whether the final value of the random variable E (f|g) calculated for each of the pixels of the first cross-sectional image 80 is equal to or greater than a predetermined threshold value. In the present preferred embodiment, the threshold value is set at 0.

In step S40, the colored pixel setter 70 sets predetermined pixel(s) of the first cross-sectional image 80 to be colored pixel(s). Suppose that the final value of the random variable E (f|g) is equal to or greater than the predetermined threshold value, and the pixel having the final value of the random variable E (f|g) is the printed pixel 82. In this case, the colored pixel setter 70 sets this pixel to be the colored pixel 92 (see FIG. 5). In the example illustrated in Table 3, the printed pixels 82 whose final value of the random variable E (f|g) is about 0.34 are set to be the colored pixels 92 (see FIG. 5).

In step S50, the non-colored pixel setter 72 sets predetermined pixel(s) of the first cross-sectional image 80 to be non-colored pixel(s). Suppose that the final value of the random variable E(f|g) is smaller than the predetermined threshold value. In this case, the non-colored pixel setter 72 sets the pixel having this final value to be the non-colored pixel 93. Suppose that the final value of the random variable E (f|g) is equal to or greater than the predetermined threshold value, and the pixel having the final value of the random variable E (f|g) is the non-printed pixel 83. In this case, the non-colored pixel setter 72 sets this pixel to be the non-colored pixel 93 (see FIG. 5). In the example illustrated in Table 3, the printed pixels 82 whose final value of the random variable E (f|g) is about −0.28 are set to be the non-colored pixels 93 (see FIG. 5). The non-printed pixels 83 are set to be the non-colored pixels 93.

In step S60, the cross-sectional image generator 74 adds color information to the colored pixels 92 set by the colored pixel setter 70. The color information is set by the user, for example. The cross-sectional image generator 74 then generates the N-th second cross-sectional image 90 that represents the colored pixels 92 to which the color information is added, and the non-colored pixels 93. The N-th second cross-sectional image 90 generated is stored in the memory 62.

In step S70, the second determiner 76 determines whether the N-th second cross-sectional image 90 is a cross-sectional image to be used for printing the final powdery material layer 15A (i.e., the uppermost powdery material layer 15A). When the determination in step S70 is YES (i.e., when the determination in step S70 indicates that the N-th second cross-sectional image 90 is a cross-sectional image to be used for printing the final powdery material layer 15A), the process for generating the second cross-sectional image 90 ends. When the determination in step S70 is NO (i.e., when the determination in step S70 indicates that the N-th second cross-sectional image 90 is not a cross-sectional image to be used for printing the final powdery material layer 15A), the process goes to step S80.

In step S80, the cross-sectional image generating apparatus 60 adds "1" to the value of N indicative of the position of the powdery material layer 15A in a sequence of layers. The process then returns to step S20.

Thus, the cross-sectional image generating apparatus 60 generates a plurality of the second cross-sectional images 90 to be used for printing the three-dimensional object 15 to be printed. Generating the second cross-sectional images 90 in the manner described above involves the use of the Markov process and the Bayes estimation. This makes it possible to provide the second cross-sectional images 90 whose noise is reduced.

Figure 11:
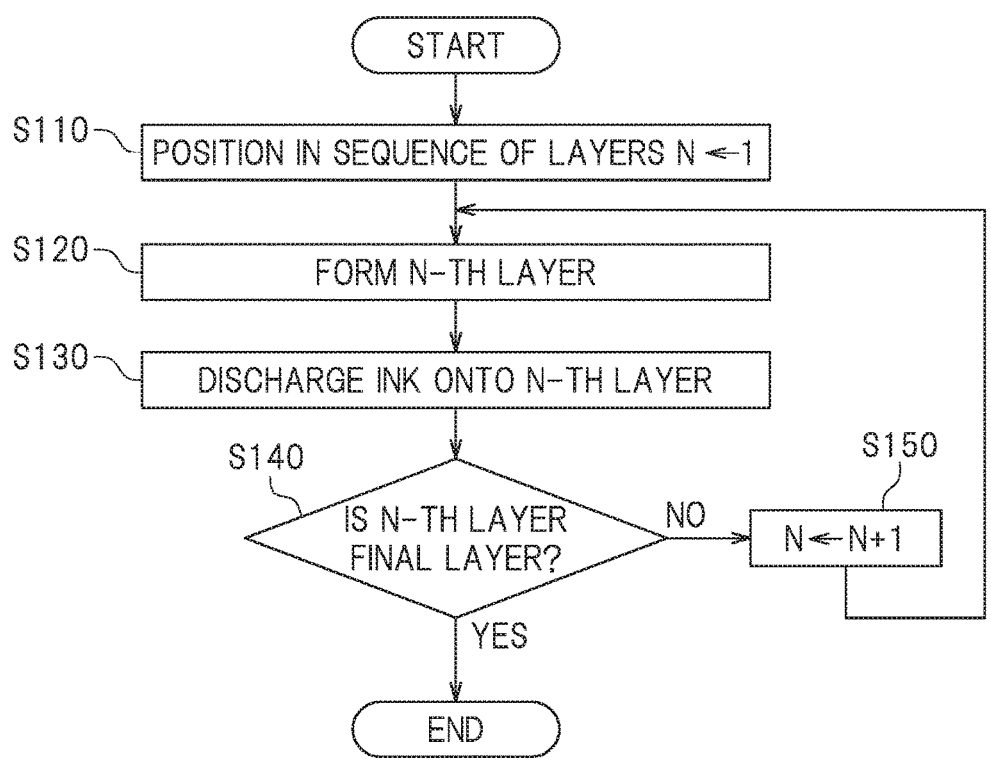
FIG. 11 is a flow chart illustrating a procedure for a three-dimensional object printing process according to a preferred embodiment of the present invention.

FIG. 11 is a flow chart illustrating a procedure for printing the three-dimensional object 15 (see FIG. 1) by the three-dimensional printing apparatus 10. The procedure for printing the three-dimensional object 15 will be described below.

In step S110, the controller 55 first sets the value of N indicative of the position of the powdery material layer 15A in a sequence of layers at "1" that represents the lowermost layer (i.e., the first layer). The controller 55 then reads the N-th first cross-sectional image 80 (see FIG. 4) and the N-th second cross-sectional image 90 (see FIG. 5) from the memory 62.

In step S120, the first controller 56 controls the binder feed head 40 in accordance with the printed pixels 82 of the N-th first cross-sectional image 80 (see FIG. 4) so as to discharge the binder onto the powdery materials 18 stored in the printing tank 22. Thus, the N-th powdery material layer 15A is formed.

In step S130, the second controller 57 controls the ink head 50 in accordance with the colored pixels 92 of the N-th second cross-sectional image 90 (see FIG. 5) so as to discharge the ink onto the N-th powdery material layer 15A. Thus, the N-th powdery material layer 15A is rendered in full color.

In step S140, the determiner 58 determines whether the N-th powdery material layer 15A is the final powdery material layer 15A (i.e., the uppermost powdery material layer 15A). When the determination in step S140 is YES (i.e., when the determination in step S140 indicates that the N-th powdery material layer 15A is the final powdery material layer 15A), the process for printing the three-dimensional object 15 ends. When the determination in step S140 is NO (i.e., when the determination in step S140 indicates that the N-th powdery material layer 15A is not the final powdery material layer 15A), the process goes to step S150.

In step S150, the controller 55 adds "1" to the value of N indicative of the position of the powdery material layer 15A in a sequence of layers. The process then returns to step S120.

Thus, the three-dimensional printing apparatus 10 forms the powdery material layers 15A in accordance with the first and second cross-sectional images 80 and 90 so as to print the three-dimensional object 15 to be printed.

As described above, when the final value of the random variable E (f|g) is equal to or greater than the predetermined threshold value and the pixel having the final value of the random variable E (f|g) is the printed pixel 82, the colored pixel setter 70 of the cross-sectional image generating apparatus 60 according to the present preferred embodiment sets the printed pixel 82 to be the colored pixel 92. When the final value of the random variable E (f|g) is smaller than the predetermined threshold value, the non-colored pixel setter 72 sets the printed pixel 82 to be the non-colored pixel 93. When the final value of the random variable E (f|g) is equal to or greater than the predetermined threshold value and the pixel having the final value of the random variable E (f|g) is the non-printed pixel 83, the non-colored pixel setter 72 sets the non-printed pixel 83 to be the non-colored pixel 93. In the present preferred embodiment, the final value of the random variable E (f|g) is calculated using the Markov process and the Bayes estimation, so that the colored pixels 92 and the non-colored pixels 93 are set more accurately than when the mean value or median value is calculated as in a conventional method. Specifically, the use of the Markov process and the Bayes estimation removes noise, which affects the quality of a three-dimensional object, from a figure defined by a line provided by reducing the outline of a cross-sectional shape. Thus, the three-dimensional printing apparatus 10 prepared separately from the cross-sectional image generating apparatus 60 suitably prints and colors the powdery material layers 15A. Consequently, the three-dimensional printing apparatus 10 prints the three-dimensional object 15 with high quality.

The mask 45 used in the cross-sectional image generating apparatus 60 according to the present preferred embodiment includes the center pixel 46 and the N adjacent pixels 47 (e.g., 40 adjacent pixels 47) surrounding the center pixel 46. The number of N adjacent pixels 47 is represented by Eq. (1). The mask 45 preferably has a square shape or a substantially square shape. Thus, an original image is reduced with higher accuracy.

The three-dimensional printing system 5 according to the present preferred embodiment includes the controller 55 that includes the first controller 56 and the second controller 57. The first controller 56 controls the binder feed head 40 in accordance with the printed pixels 82 of the first cross-sectional image 80 so as to form the powdery material layer 15A. The second controller 57 controls the ink head 50 in accordance with the colored pixels 92 of the second cross-sectional image 90 so as to discharge ink onto the powdery material layer 15A. This enables the three-dimensional printing system 5 to print the three-dimensional object 15 with high quality using the second cross-sectional image 90 generated by the cross-sectional image generating apparatus 60.

The first controller 56 of the three-dimensional printing system 5 according to the present preferred embodiment controls the binder feed head 40 in accordance with the printed pixels 82 of the first cross-sectional image 80 so as to discharge the binder onto the powdery materials 18 stored in the printing tank 22. This enables the three-dimensional printing system 5 to print the three-dimensional object 15 with high quality using the powdery materials 18.

Figure 12:
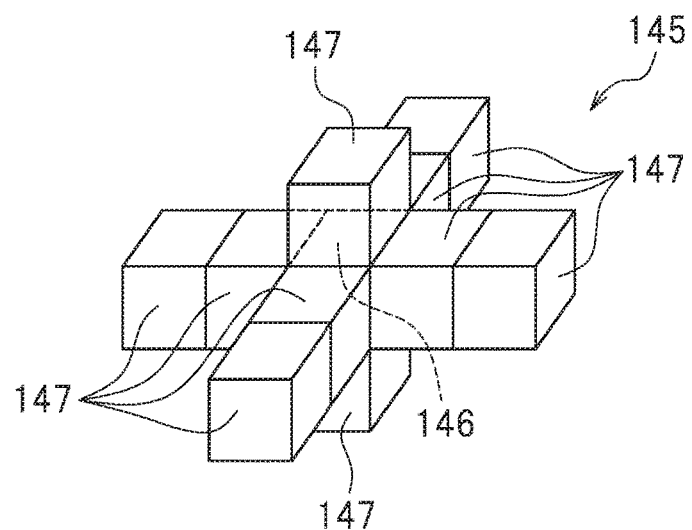
FIG. 12 is a schematic diagram illustrating a mask according to a variation of a preferred embodiment of the present invention.
Figure 13:
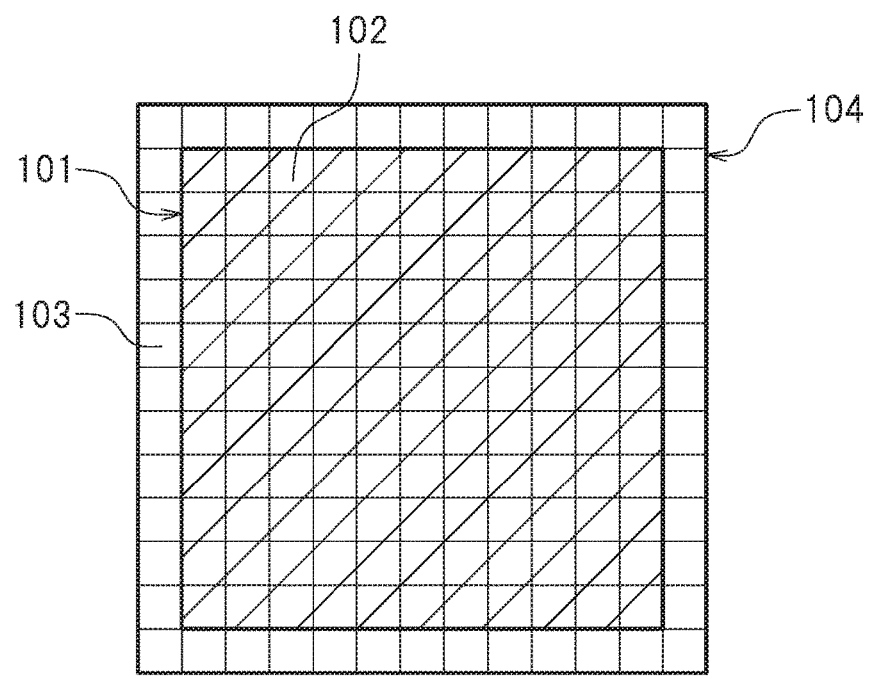
FIG. 13 is a schematic diagram illustrating a first cross-sectional image.
Figure 14:
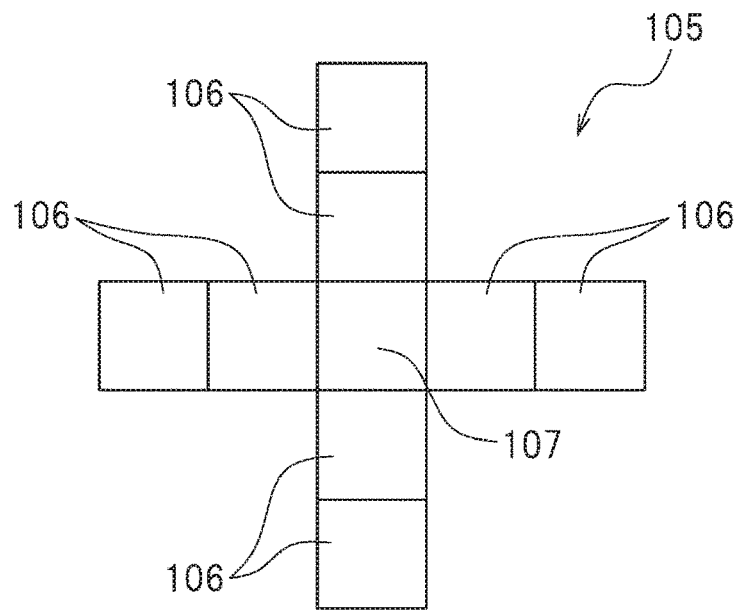
FIG. 14 is a schematic diagram illustrating a mask.

In the above-described preferred embodiment, the adjacent pixels 47 of the mask 45 are located on the same plane as the center pixel 46, and the adjacent pixels 47A of the mask 45A are located on the same plane as the center pixel 46A. The adjacent pixels 47 and the adjacent pixels 47A, however, may be located at any other suitable positions. In one example, as illustrated in FIG. 12, adjacent pixels 147 may be located above and/or below a center pixel 146. In other words, a three-dimensional mask 145 may be used. Thus, for example, when the N-th second cross-sectional image 90 is generated, the center pixel 146 is influenced by the adjacent pixel 147 for the (N−1)-th first cross-sectional image 80 neighboring the N-th first cross-sectional image 80, and the adjacent pixel 147 for the (N+1)-th first cross-sectional image 80 neighboring the N-th first cross-sectional image 80. Consequently, the three-dimensional mask 145 enables more accurate original image reduction than the two-dimensional mask 45.

The functions of the first controller 56, the second controller 57, and the determiner 58 of the controller 55, and the functions of the memory 62, the mask placer 64, the calculator 66, the first determiner 68, the colored pixel setter 70, the non-colored pixel setter 72, the cross-sectional image generator 74, and the second determiner 76 of the cross-sectional image generating apparatus 60 may be implemented by software. For example, a computer program may be read into a computer so as to implement the functions of the components of the controller 55 and the functions of the components of the cross-sectional image generating apparatus 60 by the computer. A preferred embodiment of the present invention includes a computer program to allow the computer to function as the components of the controller 55 and the components of the cross-sectional image generating apparatus 60. A preferred embodiment of the present invention further includes a non-transitory computer-readable storage medium that stores the computer program. The functions of the components of the controller 55 may be implemented by a single processor or a plurality of processors included in the controller 55. The functions of the components of the cross-sectional image generating apparatus 60 may be implemented by a single processor or a plurality of processors included in the cross-sectional image generating apparatus 60. A preferred embodiment of the present invention further includes a circuit having functions similar to those of a program to be executed by each of the components of the controller 55 and the cross-sectional image generating apparatus 60.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cross-sectional image generating apparatus to generate a cross-sectional image to be used by a three-dimensional printing apparatus to print a three-dimensional object, the three-dimensional printing apparatus being capable of printing the three-dimensional object by sequentially stacking layers each having a predetermined cross-sectional shape, the cross-sectional image generating apparatus comprising:

a memory that stores a first cross-sectional image that represents, on a pixel-by-pixel basis, the predetermined cross-sectional shape, a printed pixel located inward of the predetermined cross-sectional shape, and a non-printed pixel located outward of the predetermined cross-sectional shape;

a mask placer that places a mask on the first cross-sectional image, the mask including a center pixel and a plurality of adjacent pixels surrounding the center pixel, the mask being placed on the first cross-sectional image such that, assuming that one of the pixels of the first cross-sectional image is a target pixel, the target pixel corresponds in position to the center pixel of the mask;

a calculator that calculates, for each of the pixels of the first cross-sectional image, a final value of a random variable using a Markov process and a Bayes estimation, which is done for each of the pixels to be regarded as the target pixel corresponding in position to the center pixel of the mask;

a determiner that determines whether the final value of the random variable calculated is equal to or greater than a predetermined threshold value;

a colored pixel setter that sets the printed pixel to be a colored pixel when the final value of the random variable is equal to or greater than the predetermined threshold value and the pixel having the final value of the random variable is the printed pixel;

a non-colored pixel setter that sets the printed pixel to be a non-colored pixel when the final value of the random variable is smaller than the predetermined threshold value, and sets the non-printed pixel to be a non-colored pixel when the final value of the random variable is equal to or greater than the predetermined threshold value and the pixel having the final value of the random variable is the non-printed pixel; and a cross-sectional image generator that adds color information to the colored pixel, and generates a second cross-sectional image that represents the colored pixel to which the color information is added and the non-colored pixel.

2. The cross-sectional image generating apparatus according to claim 1, wherein the mask includes the center pixel and N adjacent pixels surrounding the center pixel, the mask being square or substantially square, a number of N adjacent pixels being represented by Eq. (1):

$$N(x) = \left\{ \left( \sum_{i=1}^{x} i \right) \times 4 \right\} \quad (1)$$

3. The cross-sectional image generating apparatus according to claim 1, wherein the mask includes the adjacent pixel located above the center pixel and the adjacent pixel located below the center pixel.

4. A three-dimensional printing system comprising:
the cross-sectional image generating apparatus according to claim 1; and
a three-dimensional printing apparatus including:
a printing head to form the layers;
an ink head to discharge ink onto the layers; and
a controller to control the printing head and the ink head; wherein
the controller includes:
a first controller to control the printing head in accordance with the printed pixel of the first cross-sectional image to form the layers; and
a second controller to control the ink head in accordance with the colored pixel of the second cross-sectional image to discharge the ink onto the layers.

5. The three-dimensional printing system according to claim 4, wherein the three-dimensional printing apparatus further includes:
a printing tank that stores a powdery material and in which the layers are to be formed;
a storage tank storing the powdery material to be fed to the printing tank; and
a feed member to feed the powdery material stored in the storage tank to the printing tank; wherein
the printing head discharges a binder onto the powdery material stored in the printing tank to form the layers; and
the first controller controls the printing head in accordance with the printed pixel of the first cross-sectional image to discharge the binder onto the powdery material stored in the printing tank.

6. A cross-sectional image generating method for generating a cross-sectional image to be used for printing a three-dimensional object having a predetermined cross-sectional shape, the method comprising:
placing a mask on a first cross-sectional image that represents, on a pixel-by-pixel basis, the predetermined cross-sectional shape, a printed pixel located inward of the cross-sectional shape, and a non-printed pixel located outward of the cross-sectional shape, the mask including a center pixel and a plurality of adjacent pixels surrounding the center pixel, the mask being placed on the first cross-sectional image such that, assuming that one of the pixels of the first cross-sectional image is a target pixel, the target pixel corresponds in position to the center pixel of the mask;
calculating, for each of the pixels of the first cross-sectional image, a final value of a random variable using a Markov process and a Bayes estimation, which is done for each of the pixels to be regarded as the target pixel corresponding in position to the center pixel of the mask;
determining whether the final value of the random variable calculated is equal to or greater than a predetermined threshold value;
setting the printed pixel to be a colored pixel when the final value of the random variable is equal to or greater than the predetermined threshold value and the pixel having the final value of the random variable is the printed pixel;
setting the printed pixel to be a non-colored pixel when the final value of the random variable is smaller than the predetermined threshold value, and setting the non-printed pixel to be a non-colored pixel when the final value of the random variable is equal to or greater than the predetermined threshold value and the pixel having the final value of the random variable is the non-printed pixel; and
adding color information to the colored pixel and generating a second cross-sectional image that represents the colored pixel to which the color information is added and the non-colored pixel.

\* \* \* \* \*